United States Patent
Mora Porta et al.

(10) Patent No.: US 11,055,247 B2
(45) Date of Patent: Jul. 6, 2021

(54) SYSTEM AND METHOD TO ENABLE FAIRNESS ON MULTI-LEVEL ARBITRATIONS FOR SWITCH ARCHITECTURES

(71) Applicant: Intel Corporation, Santa Clara, CA (US)

(72) Inventors: Gaspar Mora Porta, Campbell, CA (US); Michael A Parker, San Jose, CA (US); Roberto Penaranda Cebrian, Santa Clara, CA (US); Albert S Cheng, Bellevue, WA (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/473,561

(22) PCT Filed: Dec. 30, 2016

(86) PCT No.: PCT/IB2016/058098
§ 371 (c)(1),
(2) Date: Jun. 25, 2019

(87) PCT Pub. No.: WO2018/122583
PCT Pub. Date: Jul. 5, 2018

(65) Prior Publication Data
US 2020/0050569 A1    Feb. 13, 2020

(51) Int. Cl.
*G06F 13/40* (2006.01)
*G06F 13/366* (2006.01)
(Continued)

(52) U.S. Cl.
CPC ........ *G06F 13/4022* (2013.01); *G06F 13/366* (2013.01); *H04L 47/10* (2013.01); *H04L 49/254* (2013.01)

(58) Field of Classification Search
None
See application file for complete search history.

(56) References Cited

U.S. PATENT DOCUMENTS

| 8,190,804 B1 * | 5/2012 | Srinivasan .......... G06F 13/1615 710/244 |
| 10,191,877 B2 * | 1/2019 | Harriman ................ G06F 13/36 |

(Continued)

FOREIGN PATENT DOCUMENTS

| EP | 1383287 A1 | 1/2004 |
| WO | WO-2018122583 A1 | 7/2018 |

OTHER PUBLICATIONS

"International Application Serial No. PCT/IB2016/058098, International Search Report dated Sep. 22, 2017", 3 pgs.

(Continued)

*Primary Examiner* — Henry Tsai
*Assistant Examiner* — Christopher A Bartels
(74) *Attorney, Agent, or Firm* — Compass IP Law PC (57) ABSTRACT

In some embodiments, the invention involves using a weighted arbiter switch to provide fairness in passing input streams through a plurality of input ports to an output port. The weighted arbiter switches may be combined in a hierarchical architecture to enable routing through many levels of switches. Each input port has an associated flow counter to count input stream traffic through the input port. An arbiter switch uses the flow counts and weights from arbiter switches at a lower level in the hierarchy to generate a fairly distributed routing of input streams through the output port. Other embodiments are described and claimed.

25 Claims, 7 Drawing Sheets

(51) Int. Cl.
*H04L 12/801* (2013.01)
*H04L 12/937* (2013.01)

(56) References Cited

U.S. PATENT DOCUMENTS

| | | | |
|---|---|---|---|
| 2012/0201131 A1* | 8/2012 | Perez Costa | H04L 47/823 370/230 |
| 2014/0122771 A1* | 5/2014 | Chrysos | G06F 13/36 710/317 |
| 2016/0344629 A1* | 11/2016 | Gray | H04L 45/60 |
| 2019/0042915 A1* | 2/2019 | Akin | G06N 3/08 |

OTHER PUBLICATIONS

"International Application Serial No. PCT/IB2016/058098, Written Opinion dated Sep. 22, 2017", 5 pgs.

* cited by examiner

[PRIOR ART]

SYSTEM AND METHOD TO ENABLE FAIRNESS ON MULTI-LEVEL ARBITRATIONS FOR SWITCH ARCHITECTURES

CROSS-REFERENCE TO RELATED APPLICATION

This application is a U.S. National Stage Filing under 35 U.S.C. 371 from International Application No. PCT/IB2016/058098, filed on Dec. 30, 2016, which application is incorporated herein by reference in its entirety.

TECHNICAL FIELD

An embodiment of the present subject matter relates generally to switching architectures, and more specifically, to a system for making arbitration fairer between and among various input and output switching.

BACKGROUND

Various mechanisms exist for arbitration in switching networks and devices. For instance, in a switch that routes packets, packets queue at switch inputs and compete for outputs. This competition, or contention, requires an arbitration policy that directly affects switch performance. The best policy depends on the current state of the switch and current traffic patterns. This problem is difficult because the state space, possible transitions, and set of actions all grow exponentially with the total port count, or input output ports in a switch.

Switched Fabric or switching fabric is a network topology in which network nodes interconnect via one or more network switches (particularly crossbar switches). Because a switched fabric network spreads network traffic across multiple physical links, a switched fabric yields higher total throughput than broadcast networks, such as early Ethernet. It should be noted that periods have been replaced with asterisks in URLs in this document to avoid inadvertent hyperlinks.

Unfairness problems in many high-radix switch architectures, for instance, in tile-based microarchitectures, have not been addressed by current designs. For instance, recent Cray® Aries™ system on a chip (SOC) tile-based switch manifests the problem as described herein. A high radix switch, a switch having many ports, for instance 64 inputs by 64 outputs (64×64), may use an inefficient arbitration technique. For instance, in tile-based architecture the internal design may consist of a matrix of tiles arranged in rows and columns. The input-output switch-wide arbitrations may be decoupled into a multi-level scheme where a first level arbitration occurs among all the inputs on each row at the subswitch, or tile level, follow by a second level of arbitration for each output port in each column. However, different ports may have different traffic patterns from a different number of devices or components.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art that the present subject matter may be practiced without these specific details.

Arbitration among ports in a high-radix switch may lead to an inherent unfairness between different ports competing for the same resource (output port) when multi-layer arbitration schemes are used. Multi-layer arbitration schemes may be used in existing systems to handle wiring/timing hurdles in the implementation of a high-radix switch. This unfairness is a manifestation of the more general problem of any switch design using multi-level arbitration schemes for segregated resources, when a succession of fair arbiters lead to global switch unfairness. An embodiment of the present subject matter is a system and method relating to making switching architectures using multi-layer arbitration schemes fairer in their arbitration of input/output throughput.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the present invention may be practiced without the specific details presented herein, or in various combinations, as described herein. Furthermore, well-known features may be omitted or simplified in order not to obscure the present invention. Various examples may be given throughout this description. These are merely descriptions of specific embodiments of the invention. The scope of the invention is not limited to the examples given.

To simplify the discussion, herein, a tile-based micro architecture is described for an example switching architecture that naturally relies on multi-layer arbitration schemes.

It will be apparent to one of ordinary skill in the art after digesting this description that embodiments may be implemented using architectures other than tile-based where the architectures also make use of multi-layer arbitration schemes. For instance, any architecture using sub-crossbars to reduce the complexity and infeasibility of a central-crossbar architecture in high-radix switches but not resorting to a tile-based design, e.g., placing any number of sub-switches around the chip in a non-tiled arrangement.

Tile-based micro architectures for high-radix switches decouple the input-output switch-wide arbitrations, doing it first at the intermediate subswitch (tile) level, before a final arbitration at each output port. That leads to an inherent unfairness of these architectures between different ports competing for the same resource (output port). This is a manifestation of the more general problem of any switch design using multi-level arbitration schemes for segregated resources, when a succession of fair arbiters lead to overall switch unfairness. Embodiments described herein address this general problem, using a tile-based architecture as a prime example of its current application on any multi-level arbitration scheme that needs to ensure fairness for their contenders.

Figure 1:
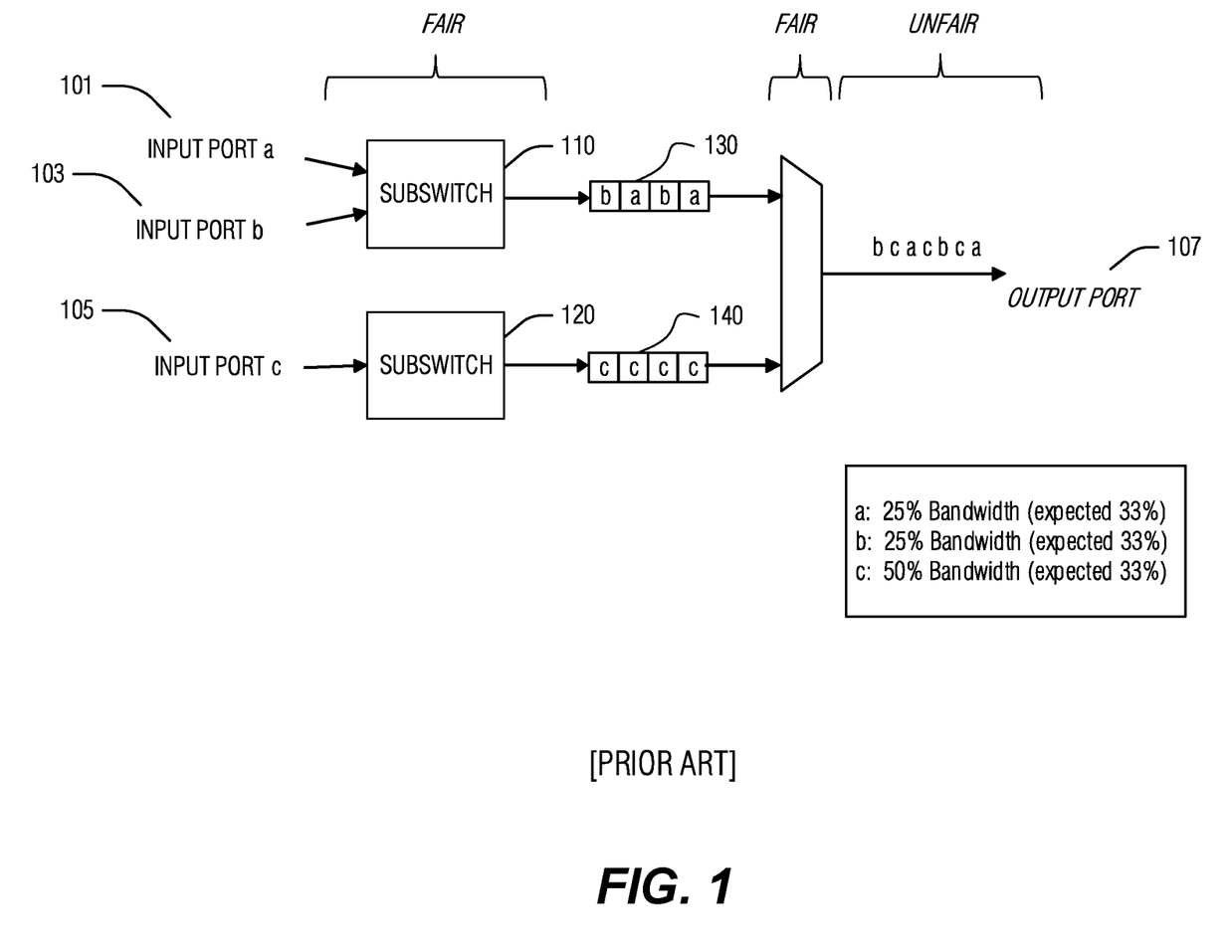
FIG. 1 is a block diagram illustrating a multi-layer arbitration mechanism using existing arbitration approaches.

FIG. 1 is a block diagram illustrating a switching mechanism using existing multi-layer arbitration approaches. Basically, the tile-based switch is divided into several sub-switches 110 and 120, connecting only a subset of input ports a, b and c 101, 103 and 105, respectively. These input ports 101, 103, 105 may compete to access a single output port 107. Fair arbitration schemes at the output port 107 (corresponding to a first-level arbitration) ensure a fair access to that resource. However, the next stage (second-level arbitration) requires arbitrating among contenders to that same output port from all subswitches 110, 120. Again, simplicity and speed mandates the usage of simple and fair arbitration schemes at output port 107, but this introduces a potential intrinsic unfairness if there are several input port contenders on one subswitch 110, while there are few input port contenders on another subswitch 120, all of them competing for the same output port.

FIG. 1 depicts three input ports 101, 103 and 105 that are competing to access the same output port 107. Input ports (a) 101 and (b) 103 are connected to the same subswitch 110. Hence, the fair arbitration scheme at subswitch 110 forwards 50% of the traffic from each input port to the next buffer 130 in this multi-layer arbitration scheme. Input port (c) 105 doesn't have to compete with another input port, and loads the next buffer with only its packets in buffer 140. Then, the next fair arbitration stage to grant final access to the output port 107 will provide fair access between the two sub-switches 110 and 120, resulting in an unfair treatment of the three input ports 101, 103 and 105, because input port (c) will get 50% of the total quota, while (a) and (b) will share the remaining 50% quota, leading to get just 25% of the quota each. The right expectation is that every input port gets a fair 33% of the quota.

This result is an undesired behavior of the switch that needs to be addressed for any viable product using any type of multi-level arbitration schemes like the tile-based switch architectures for high-radix switches use. Embodiments address this general problem of multi-level arbitration schemes by adding a mechanism to track fairness across the switch.

Embodiments described herein provide a lightweight family of solutions to this intrinsic unfairness problem exhibited at the switch level of most existing multilevel arbitration schemes, where the intermediate internal arbitration stages may be fair, but tend not to be fair at the global (switch) level. Embodiments described track the concept of "flow," which is defined as an input port necessity to follow certain path within the arbitration stages or switch. Each flow represents a requirement of fair treatment at the switch level. Flows may be tracked in a structure that associates a counter with each input port.

Figure 2:
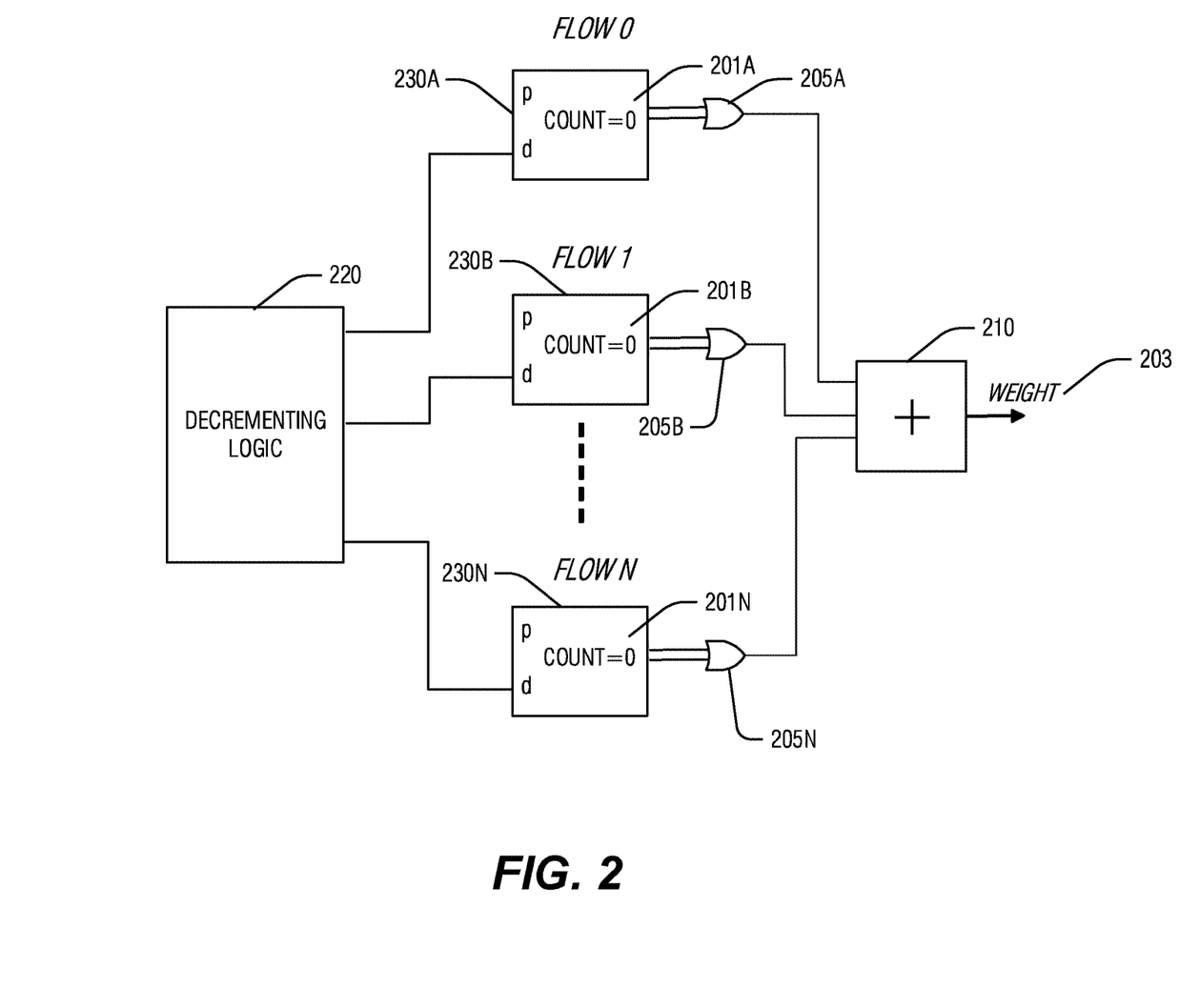
FIG. 2 is a block diagram illustrating counters inserted into the switching arbitration mechanism to monitor the flow from input ports, according to an embodiment.

FIG. 2 is a block diagram illustrating counters 230A-N inserted into the switching arbitration mechanism to monitor the flows from input ports. In embodiments, there may be one counter per input port. The bit-depth of each counter is customizable in the full range of 1-bit to as many bits as required to track all possible flow occurrences from that input port (N). In an embodiment, the counter may be as low as one bit (hence increasing fuzziness in flow detection). This minimalism results in an extremely lightweight solution. Each time an input flow, for instance, one that can be tied to a header or packet crossing, uses the subswitch, the appropriate count 201A-N is increased for that input port. This counting effectively accounts for some pressure of flows for that input port. In other embodiments, more than 1 bit may be used to provide more flow accuracy. In discussions below, examples may use a 2-bit counter for illustration. It will be understood that a 1-bit counter may result in fuzzy accuracy; and an n-bit counter may result in full flow-detection accuracy, where n is big enough to hold a value equal to the number of all possible input flows in a period. In discussion below, a 2-bit counter results in sufficient accuracy to provide fairness. An m-bit counter, where 1<m<n, may be understood to be of sufficient accuracy to provide fairness, but not the maximum possible accuracy. As m approaches n accuracy increases, but with a trade-off of overhead and hardware costs, for instance in register size.

In an embodiment, the number of flows encountered within a running packet window may be tracked, or counted. For example, each output may track the number of flows encountered during the last 100 packets. After 100 packets are reached, the counter may be reset to zero to begin tracking again.

The flow counters, either fuzzy or accurate, will enable the adder 210 to calculate the weight and provide the weight on the arbiter by adding the number of input flow counters with non-zero values within the subswitch. OR circuits 205A-N connected to the registers that count flows enable their signal if a non-zero value is contained there. The number of active signals coming from the OR circuits 205A-N is added for the subswitch at 210. That number, or weight 203, is forwarded on to be used in the arbiter, or to pass through to a next arbitration stage. A common weighted round robin arbiter, or another alternative weighted arbiter, will suffice to make the tile-based switch architecture fair at the switch level, by using embodiments described herein.

In an embodiment, accurate flow-pressure measurements at each sub-arbiter allow propagating effective weights to subsequent arbitration schemes that may ensure global fairness in the multi-level arbitration. In addition to incrementing flow counters, there needs to be a mechanism to decrement the counters to accurately reflect the current flow pressure, or traffic through the input ports and subswitches, as traffic lessens. In embodiments, decrementing logic is used to reflect more accurate traffic flow.

In an embodiment, a mechanism to indicate a potential reduction of the flow pressure, due to changing conditions in traffic, may be used. One lightweight embodiment may periodically decrease the number of flows detected with decrementing logic 220. The decrementing logic may decrement the counters 201A-N. Another embodiment may trigger an event. In an embodiment, an event occurs when a pre-determined number of packets are egressed from the final arbitration stage resulting in a decrease of all flow counters. In another embodiment, an event may occur when a predetermined number of packets coming from one subswitch are egressed to decrease all flow counters in that subswitch only. In another embodiment, for increased accuracy, when using deep enough bit counters (e.g., n as discussed above), the event may occur when egressing a packet pertaining to a particular input port to decrease just that flow counter linked to that input port. Another embodiment may decrement all counters 201A-N at once.

Throughout the description herein, two levels of arbitration are used for examples for simplicity. However, it will be understood that embodiments may scale to multi-level arbitration levels by propagating the flow accounting information to the next stage, and with the weights that need to be used for the next arbitration.

In the past, this issue of unfairness in switches using multi-level arbitration schemes has been addressed by carefully selecting subsets of ports to connect to specific parts of the system, to minimize contention. However, this approach has limited scope as it is only applicable to specific and regular cases, easily broken by re-configurations of the system due to faults, performance, etc. Also, pin and packaging constrains may limit the applicability of pre-assigning ports for different elements of the system, rendering this solution inapplicable in the real world.

Embodiments of the fairness arbitration system as described herein may be extremely lightweight, but require some tuning in operation, or implement a fully accurate fairness mechanism using more complex implementation requirements. An embodiment for full accuracy in flow accounting may completely fix switch unfairness for most situations, but will require more overhead. It will be understood that different routing or switching applications may be best implemented with varying levels of flow accuracy to trade off accuracy for a smaller overhead.

Figure 3:
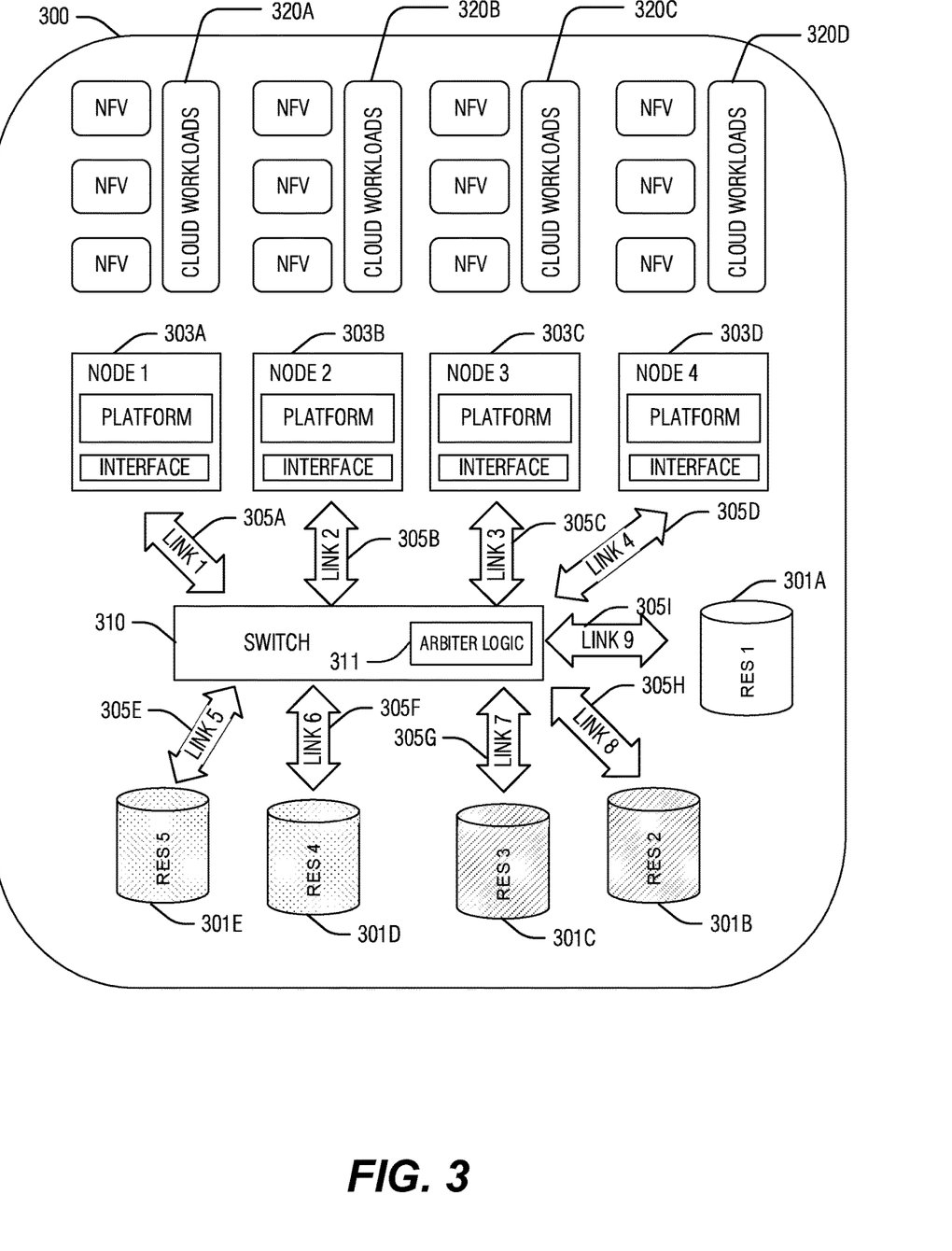
FIG. 3 is a block diagram illustrating a cloud provider multi-tenant data center example for implementation of an embodiment of the multi-level fairness arbitration in switch architectures.

FIG. 3 is a block diagram illustrating a cloud provider multi-tenant data center example for implementation of an embodiment of the multi-level fairness arbitration in switch architectures. An important aspect of current data center architectures is the implementation of Quality of Service (QoS) techniques, especially the ones related to providing fairness on accessing certain resources located the data center 300.

Disaggregation of resources 301A-E will be more and more relevant in next generation of data centers. Disaggregating resources 301 from the node 303A-D has clear benefits in terms of data center total cost of ownership (TCO) and flexibility. However, one of the critical and challenging aspects here is how switching fabric 310 is shared by users and what mechanisms are implemented to reduce interaction between different workloads 320A-D and fair access to the remote resources 301A-E. In an embodiment, switching fabric 310 includes arbiter logic 311 to calculate flow counts and weights to provide fairness in routing input streams to output ports or links. The arbiter logic 311 may be a set of instructions stored in a computer readable medium, or logic encoded in circuitry to effect the instructions and calculations. FIG. 3 provides an example where fairness between different workloads 320 running nodes 1-4 303 accessing to three different type of disaggregated resources 301 is required. A cloud provider is fundamental to have mechanisms that allows having certain degree of guaranteed switching fabric bandwidth through the switching links 305A-I between all the different workloads 320 running in the data center 300, which access the multiple disaggregated resources 301.

Existing switching fabric schemes may already provide some level of QoS features (such as Service Lanes or Virtual Fabrics) that may be used to implement some degree of fairness between several types of workloads. However, these schemes have limitations in terms of scalability (i.e., limited number of service lanes). In these situations, any scheme that enhances fairness and QoS will be required. Technological constraints and market trends in high performance computing (HPC) and the datacenter lead to the development of high-radix switches by all major vendors. These switches rely heavily on tile-based architectures and multi-level arbitration schemes that manifest intrinsic unfairness treatment of switch ports, as described herein. Embodiments as described herein may be applied to a data center architecture to address this unfairness; thus, improving the highly required QoS capabilities of the whole system.

Referring again to FIG. 2, in an embodiment includes an accounting mechanism to track flows that require fair treatment at the subswitch or first-level arbitration stage. This may be achieved with a set of registers or memory structures 230A-N for each potential flow in the subswitch. The register or memory may have an adjustable depth depending on the precision desired for the flow detection. As discussed above, the depth may range from as low as one or two bits, to as many bits are required to completely account for all of the packets for every flow.

The register/memory count 201A-N for each flow increases by one every time a new flow needs detection/accounting. In an embodiment, once the maximum stored value is reached, further increments will not have any effect. With this scheme, each flow counter 201A-N in the fuzzy mode tracks how heavy the flow pressure is, as opposed to a fully-accurate accounting where the value represents the actual flow pressure.

Next, weighting 210 logic counts the number of registers 230A-N with non-zero values, accounting for total active flow pressure. This count is the number propagated to the weighted round-robin arbiter to use as weight for requests coming from this subswitch or arbitration stage.

Decrementing logic 220 may function in two modes, one fuzzy and one fully-accurate as well, a decision tied to the method selected for the flow accounting system. In the fuzzy mode, the decrementing logic, on a triggering mechanism, performs a global subtraction of one on all registers at once (only on non-zero values). The triggering mechanism can be as simple as an interval timer or be based on preset packet counts or any other available event happening in the switch. The fully-accurate mode usually requires the specific reduction of the counter of a specific flow (instead of doing it obliviously on all at once). For instance, the fully accurate decrement method may decrement a flow by one as triggered by a packet from a particular input port actually being egressed from the output buffer.

Figure 4:
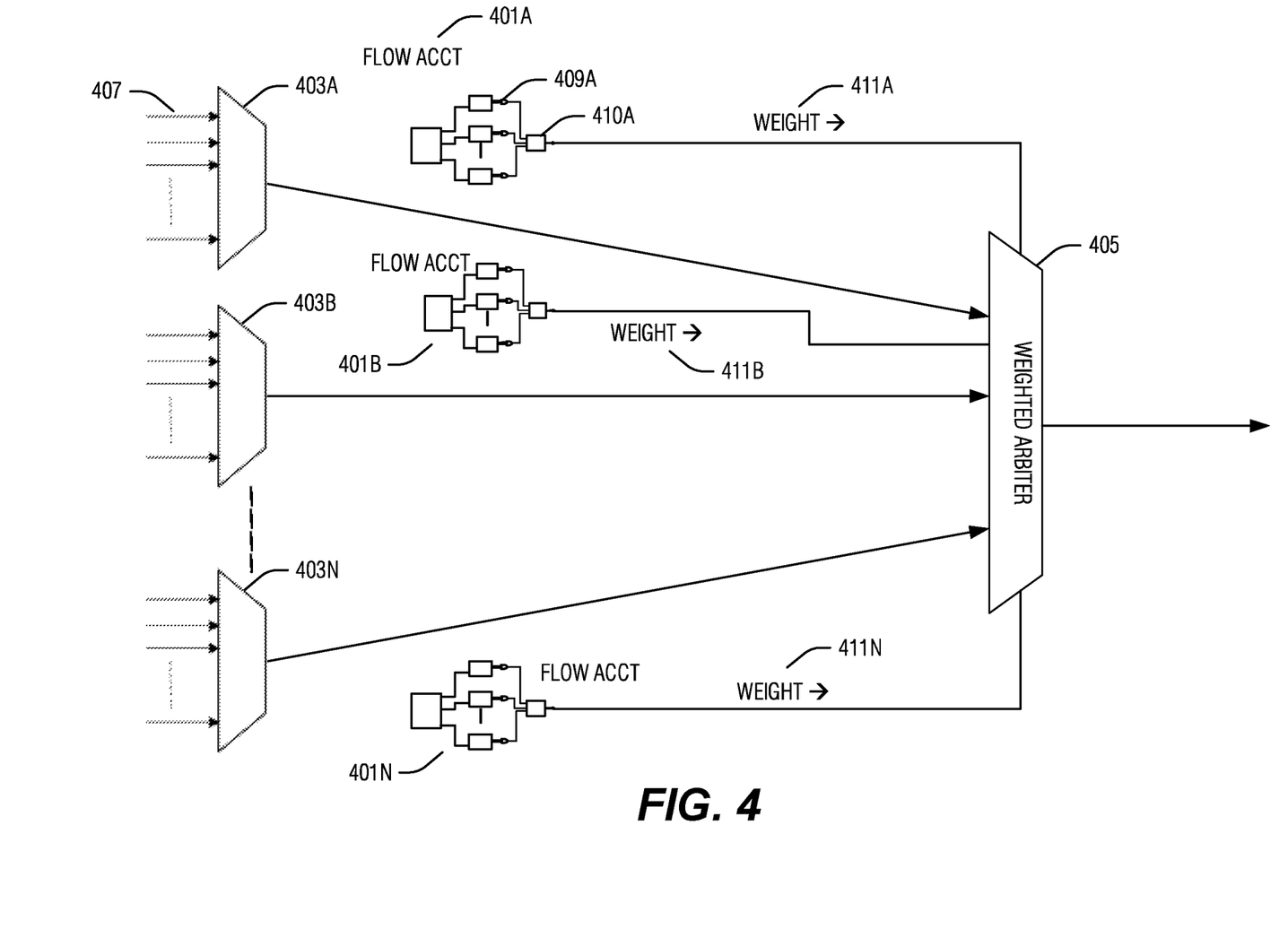
FIG. 4 is a block diagram illustrating how the flow accounting structures are logically linked to the different arbiters, according to an embodiment.

FIG. 4 shows how the flow accounting structures 401A-N are logically linked to the different arbiters 403A-N in a multilevel arbitration scheme. In an embodiment, each set of flow contenders, or inputs, 407 on a first level arbiter 403A are to be tracked (either fuzzily or accurately) to report to the next stage arbiter 405 the weights 411A-N that must be used to provide global fairness. The accounting structures 401A includes the OR circuit 409A to identify how many non-zero counts there are, and adder 410A to add the non-zero counts to generate a weight for that arbiter. The logic (FIG. 2 220) to decrement the values stored in the flow counters, is in flow accounting logic 401A. All of all nonzero occurrences from 409A are added in adder 410A to propagate to the weight 411A. While the architecture has been described for the first arbiter 403A, It will be understood that arbiters 403A-N also have associated flow accounting 401A-N and resulting in weights 411A-N.

Figure 5:
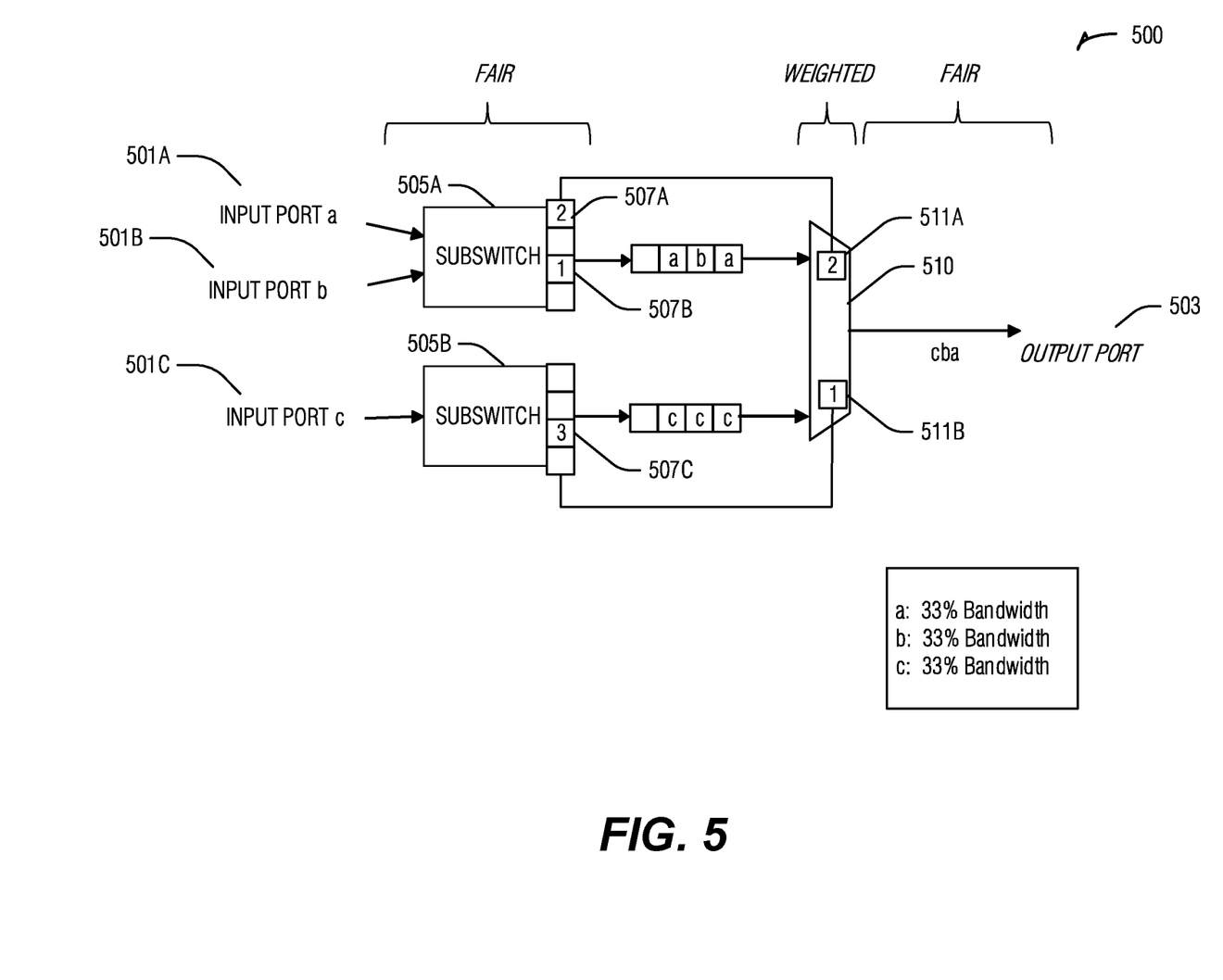
FIG. 5 is a block diagram illustrating a flow tracking structure, according to an embodiment.

Referring now to FIG. 5, there is shown a flow tracking structure 500 to load the weights on the weighted arbiter to provide fairness, according to an embodiment. In this example, three input flows a, b, and c (501A-C) compete for the same output port 503. Input port a 501A and input port b 501B are on the same subswitch 505A. Every time they send a packet through the subswitch 505A the counter for that input port 507 increases by one. In this case, input port a 501A has sent two packets, as indicated by the count shown 507A. Input port b 501B appears to have sent one packet, as indicated in count 507B. Since there are two nonzero values in that accounting structure in this example, a weight of two (2) 511A is propagated to the weighted arbiter 510. Input port c 501C is not competing with another input port in subswitch 505B and propagates three packets through the subswitch, as indicated by a value of three (3) in counter 507C. The counter for subswitch 505B has only one nonzero value in 507C; hence, the weight to propagate 511B is one (1). With these two weights 511A-B, the last arbiter 510 provides fairness among all input ports accessing the same output port 503. For instance, the weighted arbiter pushes through two inputs from subswitch 505A for each one input from subswitch 505B. This weighted arbitration continues in this proportion until a change in non-zero counts 507 cause a change in weights 511A-B.

It will be understood that flow counters at the same level of the hierarchical arbitration switch should use the counters of the same accuracy. However, the weight information passed from the counters to the weighted arbiter at each level are independent of the accuracy. Therefore, flow counter accuracy at different levels may be of a different accuracy.

Figure 6:
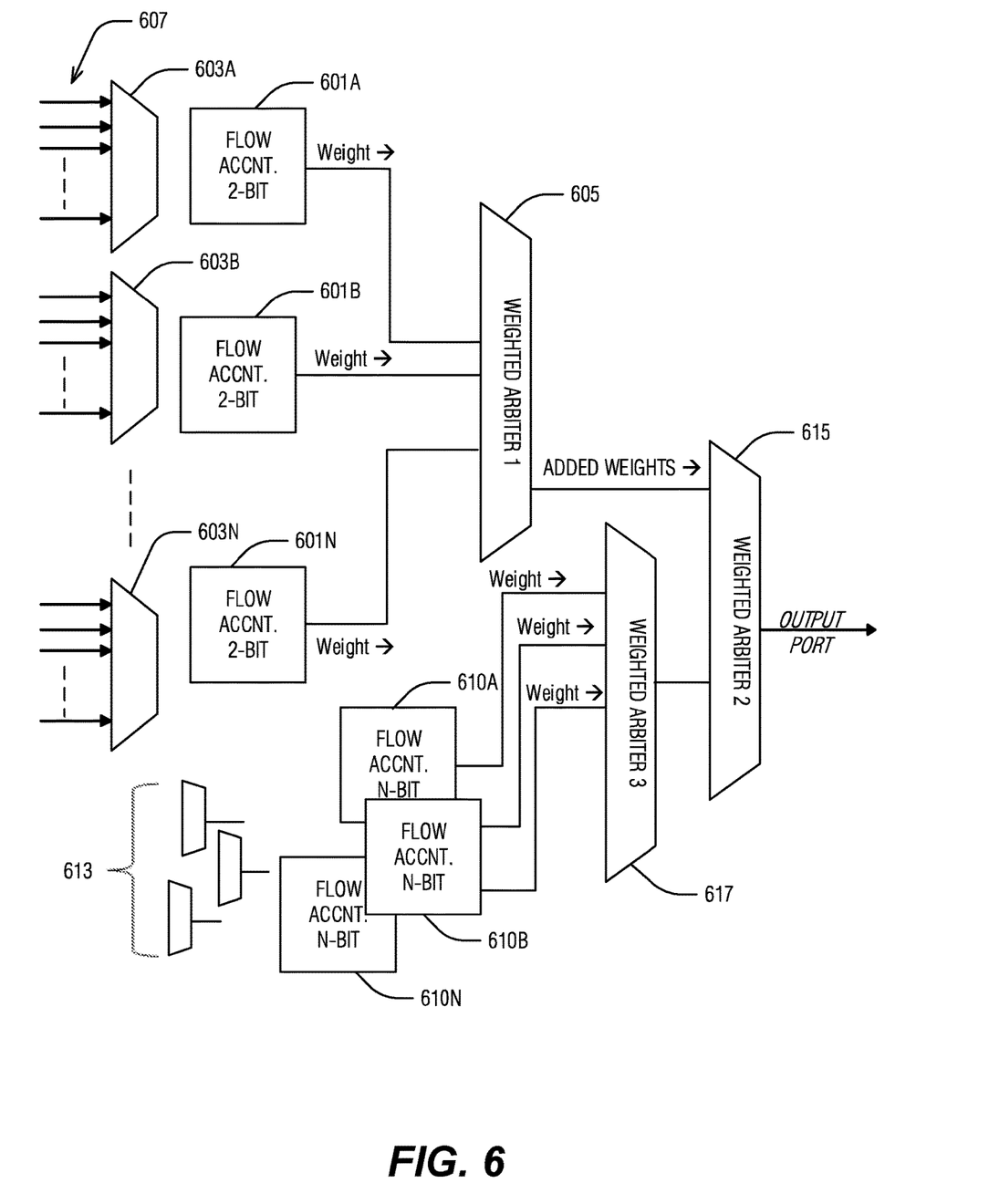
FIG. 6 illustrates a multi-level hierarchy arbitration switch architecture, according to an embodiment.

FIG. 6 illustrates a three-level hierarchy arbitration switch architecture, according to an embodiment, which illustrates how this embodiment can be naturally extended to any multi-level arbitration hierarchy. In this multi-level switching hierarchy, inputs 607 are arbitrated at weighted arbiter switches 603A-N. In an embodiment, flow accounting at 601A-N uses a 2-bit counter. The counter may decrement as packages move past weighted arbiter 1 (605), or move past weighted arbiter 2 (615), or at a specific periodicity, to keep the weight associated with the arbiters current.

In an embodiment, weighted arbiter switches 613 use a flow accounting mechanism 610A-N with a highly accurate flow accuracy, for instance with N-bit registers, where N=32. The more accurate flow accounting 610 sends the weighted arbiter 3 circuitry 617 weight information. This weight information can help ensure or increase fairness across all input ports at this arbitration stage 617. A simple sum of all weights computed for weighted arbiter 3 (617) can be propagated to the next arbitration stage 615. The weighted arbiter 615 can also receive the sum of all weights in the previous arbitration stage 605. At this point the last arbitration stage 615 is ready to use the weights received to provide global fairness across all input ports.

Figure 7:
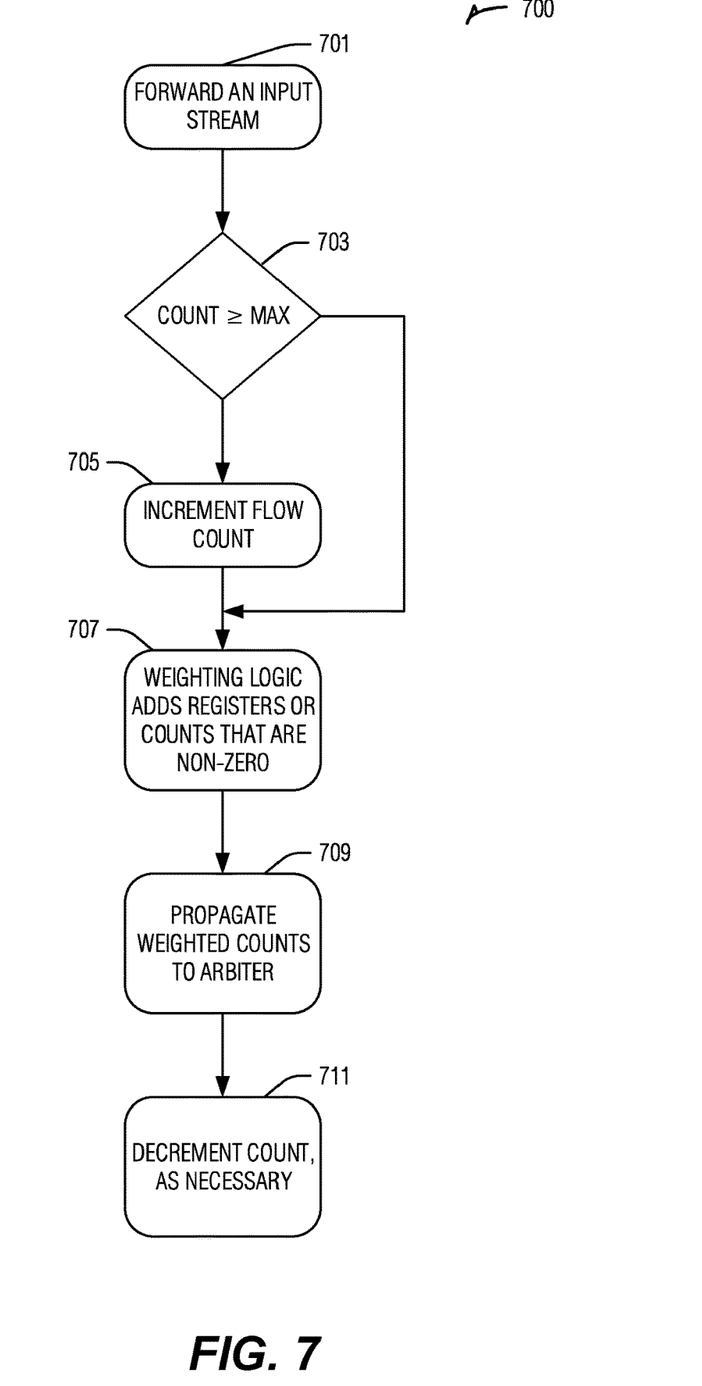
FIG. 7 is a flow diagram illustrating a method for calculating fairness through a switch, according to an embodiment.

FIG. 7 is a flow diagram illustrating a method 700 for calculating fairness through a switch, according to an embodiment. An input port forwards an input stream in block 701. It will be understood that various implementations and embodiments will have multiple input streams for each weighted arbiter switch. A count is generated by each flow counter associated with each input stream. A predefined maximum is associated with the count. A determination is made as to whether the count is greater than or equal to the predefined maximum in block 703. If the input port forwards an input stream or packet and the count is not greater than or equal to the maximum, then the flow count is incremented in block 705. Otherwise the incrementing is bypassed. Weighting logic counts the number of flow-counters that hold nonzero values that are associated with that arbiter switch in block 707. The count value may reside in either a register or memory structure, or other storage location, based on the implementation of the arbiter switch. As discussed above, the accuracy for the flow counts may be as few as one bit or as many as N bits. The weight for the next arbitration stage is propagated to the next arbiter at block 709.

In order for the counts and weights to more accurately reflect the changing nature of input streams among the input ports over time, the flow count needs to be decremented periodically to account for changes in input stream distributions through the various input ports for that switch. For instance, in an example, at a given time period, all input streams might be distributed among multiple input ports associated with that switch. Within the next time period, all input streams might come through a single input port. The count is to be decremented either at a predefined periodicity, or in response to a trigger event. A trigger event could be as simple as when the input stream for a first input port finally gets passed through the output buffer and through to the output port. At that time the flow court for that input port may be decremented. This embodiment should be fairly accurate regarding input stream distribution. In another embodiment, each counter may be decremented every 10 μs or 10 seconds, or other predefined period, depending on how much information is passed through the input ports in a period of time. In another embodiment, all counts may be decremented at the given periodicity. It will be understood, that a count will not be decremented below zero value.

ADDITIONAL NOTES AND EXAMPLES

Examples can include subject matter such as a method, means for performing acts of the method, at least one machine-readable medium including instructions that, when performed by a machine cause the machine to performs acts of the method, or of an apparatus or system for switch arbitration, according to embodiments and examples described herein.

Example 1 is a switch comprising: a first flow counter circuitry associated with a first input port, the first flow counter circuitry to count input streams flowing through the first input port to generate input stream counts; a weighted arbiter circuitry to pass input streams from the first input port to an output port, wherein fairness is to be calculated based on a weight derived from the count of input streams from first flow counter circuitry.

In Example 2, the subject matter of Example 1 optionally includes wherein the fairness of the weighted arbiter circuitry is further to be based on an accuracy level of the first flow counter.

In Example 3, the subject matter of Example 2 optionally includes wherein the accuracy level of the first flow counter is a same accuracy as flow counters in other switches at a same hierarchical level of the switch.

In Example 4, the subject matter of Example 3 optionally includes wherein the accuracy level of the first flow counter is a different accuracy as flow counters in other switches at a different hierarchical level of the switch.

In Example 5, the subject matter of any one or more of Examples 1-4 optionally include decrementing logic to adjust the input stream counts either responsive to a trigger event or at a pre-defined interval.

In Example 6, the subject matter of Example 5 optionally includes wherein the decrementing logic is to decrement the count of the first flow counter, responsive to a trigger event comprising when an input stream from the first input port is passed through an associated first output buffer to the output port.

In Example 7, the subject matter of any one or more of Examples 5-6 optionally include at least one additional flow counter circuitry associated with at least one additional input port, the at least one additional flow counter circuitry to count input streams flowing through the associated at least one additional input port, wherein the fairness is to be calculated on a weight derived from the count of input streams from first flow counter circuitry and from the count of input streams from the at least one additional flow counter circuitry.

In Example 8, the subject matter of any one or more of Examples 5-7 optionally include wherein the pre-defined interval comprises one of an interval based on time and an interval based on packet counts.

In Example 9, the subject matter of any one or more of Examples 1-8 optionally include wherein the first flow counter circuitry comprises an N-bit counter, where N is close to or equal to a count of possible input flows in a period.

In Example 10, the subject matter of any one or more of Examples 1-9 optionally include <M<N.

In Example 11, the subject matter of any one or more of Examples 1-10 optionally include wherein the flow counter circuitry comprises a set of at least one of a register and memory structure.

Example 12 is a system for switch arbitration, comprising: a sub switch of a plurality of sub switches, the sub switch coupled to a plurality of input ports and an output port; an input port of the plurality of input ports coupled to an associated flow counter, the associated flow counter to increment when an input flows through the input port; a first weighted arbiter switch coupled to the plurality of sub switches, the first weighted arbiter to receive a weight value from the subswitch, the weight value of the subswitch being dependent on at least one flow counter value associated with the subswitch, the first weighted arbiter to receive an additional weight value from an additional subswitch, the additional weight value of the additional subswitch being dependent on at least one flow counter value associated with the additional subswitch, wherein the first weighted arbiter switch enables flow from the plurality of input ports to the output port based on the respective weights for the subswitch and additional subswitch.

In Example 13, the subject matter of Example 12 optionally includes a second weighted arbiter switch communicatively coupled to the first weighted arbiter switch and at least one additional weighted arbiter switch, wherein the first weighted arbiter switch and the at least one additional arbiter switch send weight information associated with input flow to the second weighted arbiter switch, the second weighted arbiter switch to enable flow to the output port based on the sent weight information.

In Example 14, the subject matter of any one or more of Examples 12-13 optionally include wherein the at least one flow counter has a same accuracy as other flow counters at a same hierarchical switch level.

In Example 15, the subject matter of Example 14 optionally includes wherein the same accuracy is one of fuzzy accuracy, full flow-detection accuracy, or sufficient accuracy.

In Example 16, the subject matter of any one or more of Examples 14-15 optionally include wherein a flow counter at a first hierarchical switch level comprises an N-bit counter, where N is close to or equal to the number of possible input flows in a period.

In Example 17, the subject matter of Example 16 optionally includes <M<N.

In Example 18, the subject matter of any one or more of Examples 14-17 optionally include wherein a flow counter at a first hierarchical switch level has a different accuracy than a flow counter at a second hierarchical switch level.

In Example 19, the subject matter of any one or more of Examples 12-18 optionally include decrementing logic to adjust the associated flow counter either responsive to a trigger event or at a pre-defined interval.

In Example 20, the subject matter of any one or more of Examples 12-19 optionally include a node of a plurality of nodes in a data center, the node coupled to one or more of the plurality subswitches, wherein the plurality of nodes are to access a plurality of disaggregated resources via the plurality of subswitches.

In Example 21, the subject matter of any one or more of Examples 12-20 optionally include ports in a tile architecture.

In Example 22, the subject matter of any one or more of Examples 12-21 optionally include wherein the associated flow counter comprises a set of at least one of a register and memory structure.

In Example 23, the subject matter of Example 22 optionally includes wherein the set of at least one of a register and memory structure are of an adjustable depth, the depth being dependent on a desired precision for flow detection.

Example 24 is a computer implemented method for switch arbitration, comprising: receiving at switch circuitry a first input from a first input port, and at least a second input from one or more of a plurality of additional input ports; incrementing flow counts associated with the first input port and incrementing flow counts associated with the plurality of additional input ports up to a maximum count; summing non-zero flow counts for the input port to determine a weighted count for the input port; propagating the weighted count to a weighted arbiter circuitry; and passing input from the input ports through the weighted arbiter circuitry based on the propagated weighted count.

In Example 25, the subject matter of Example 24 optionally includes wherein the summing further comprises calculating an average flow count for the input port, the sum to be calculated between one of a timing window or a packet window.

In Example 26, the subject matter of any one or more of Examples 24-25 optionally include adjusting the flow counts associated with first input port and adjusting flow counts associated with the plurality of additional input ports, the adjusting being either responsive to a trigger event or at a pre-defined interval.

Example 27 is a system for switch arbitration comprising: means for receiving at switch circuitry a first input from a first input port, and at least a second input from one or more of a plurality of additional input ports; means for incrementing flow counts associated with the first input port and with the plurality of additional input ports up to a maximum count; means for summing non-zero flow counts for each input port to determine a weighted count for each input port;

means for propagating the weighted count to a weighted arbiter circuitry to generate a propagated weight count; and means for passing input from the input ports through the weighted arbiter circuitry based on the propagated weighted count.

In Example 28, the subject matter of Example 27 optionally includes wherein the summing further comprises means for calculating an average flow count for the input port, to generate a sum to be calculated between one of a timing window or a packet window.

In Example 29, the subject matter of any one or more of Examples 27-28 optionally include means for adjusting the flow counts associated with first input port and means for adjusting flow counts associated with the plurality of additional input ports, the adjusting being either responsive to a trigger event or at a pre-defined interval.

Example 30 is at least one computer readable circuitry medium having instructions encoded thereon, the instructions when executed on a machine cause the machine to: receive at switch circuitry a first input from a first input port, and at least a second input from one or more of a plurality of additional input ports; increment flow counts associated with the first input port and increment flow counts associated with the plurality of additional input ports up to a maximum count; sum non-zero flow counts for the input port to determine a weighted count for the input port; propagate the weighted count to a weighted arbiter circuitry; and pass input from the input ports through the weighted arbiter circuitry based on the propagated weight count.

In Example 31, the subject matter of Example 30 optionally includes wherein to sum further comprises instructions to calculate an average flow count for the input port, the sum to be calculated between one of a timing window or a packet window.

In Example 32, the subject matter of any one or more of Examples 30-31 optionally include instructions to adjust the flow counts associated with first input port and adjust flow counts associated with the plurality of additional input ports, to adjust being either responsive to a trigger event or at a pre-defined interval.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

While this subject matter has been described with reference to illustrative embodiments, this description is not intended to be construed in a limiting sense. Various modifications of the illustrative embodiments, as well as other embodiments of the invention, which are apparent to persons skilled in the art to which the present subject matter pertains are deemed to lie within the spirit and scope of the invention.

What is claimed is:

1. A switch comprising:
   first flow counter circuitry associated with a first input port, the first flow counter circuitry to count input streams flowing through the first input port to generate input stream counts;
   second flow counter circuitry associated with a second input port, the second flow counter circuitry to count input streams flowing through the second input port; and
   a weighted arbiter circuitry to pass input streams from at least one of the first input port or the second input port to an output port based on a weight derived from the input stream counts from the first flow counter circuitry and input stream counts from the second flow counter circuitry, the input stream counts from the at least one of the first flow counter circuitry or the second flow counter circuitry adjusted, after at least one of the input streams from the at least one of the first flow counter circuitry or the second flow counter circuitry has been passed, dependent on a mode within the switch.

2. The switch as recited in claim 1, wherein the weighted arbiter circuitry is further configured to pass the input streams from the at least one of the first flow counter circuitry or the second flow counter circuitry dependent on an accuracy level of the first flow counter circuitry.

3. The switch as recited in claim 2, wherein the accuracy level of the first flow counter circuitry is a same accuracy as flow counter circuitry in other switches at a same hierarchical level of the switch.

4. The switch as recited in claim 3, wherein the accuracy level of the first flow counter circuitry is a different accuracy as flow counters in other switches at a different hierarchical level of the switch.

5. The switch as recited in claim 1, wherein each of the first and second flow counter circuitry comprises a set of at least one of a register and memory structure.

6. The switch as recited in claim 1, wherein:
   the first flow counter circuitry is associated with a first subswitch;
   the second flow counter circuitry is associated with a second subswitch; and
   further comprising decrementing logic configured to:
   decrement, responsive to a trigger event and dependent on a mode of the decrementing logic, the input stream counts from at least one of the first flow counter circuitry or the second flow counter circuitry;
   decrease, in response to a plurality of packets originating from the first subswitch being egressed from a final arbitration stage of the switch, all flow counters of only the first subswitch having a non-zero value; and
   decrease, in response to a plurality of packets originating from the second subswitch being egressed from the final arbitration stage of the switch, all flow counters of only the second subswitch having a non-zero value.

7. The switch as recited in claim 1, wherein:
   the first flow counter circuitry is associated with a first subswitch;
   the second flow counter circuitry is associated with a second subswitch; and
   further comprising decrementing logic configured to:
   decrement, responsive to a trigger event and dependent on dependent on a mode of the decrementing logic, the input stream counts from at least one of the first flow counter circuitry or the second flow counter circuitry; and simultaneously decrease, in response to a plurality of packets being egressed from a final arbitration stage of the switch, all flow counters of the first subswitch and the second subswitch having a non-zero value.

8. The switch as recited in claim 1, wherein:

the mode comprises a fuzzy mode and a fully-accurate accounting mode;

in the fuzzy mode, the first flow counter circuitry is configured to track flow pressure through the first flow counter circuitry without providing a fully-accurate count of the first flow counter circuitry and the second flow counter circuitry is configured to track flow pressure through the second flow counter circuitry without providing a fully-accurate count of the second flow counter circuitry; and in the fully-accurate accounting mode, the first flow counter circuitry is configured to provide a value of the first flow counter circuitry that represents an actual flow pressure through the first flow counter circuitry, and the second flow counter circuitry is configured to provide a value of the second flow counter circuitry that represents an actual flow pressure through the second flow counter circuitry.

9. The switch as recited in claim 8, wherein:

the first flow counter circuitry is associated with a first subswitch;

the second flow counter circuitry is associated with a second subswitch; and further comprising decrementing logic configured to:

decrement, responsive to a trigger event and dependent on dependent on a mode of the decrementing logic, the input stream counts from at least one of the first flow counter circuitry or the second flow counter circuitry; and simultaneously decrease, in response to a plurality of packets being egressed from a final arbitration stage of the switch, all flow counters of the first subswitch and the second subswitch having a non-zero value.

10. The switch as recited in claim 8, further comprising decrementing logic configured to:

decrement, responsive to a trigger event and dependent on a mode of the decrementing logic, the input stream counts from at least one of the first flow counter circuitry or the second flow counter circuitry;

decrease, in response to a packet originating from the first flow counter circuitry being egressed from a final arbitration stage of the switch; only the first flow counter circuitry; and decrease, in response to a packet originating from the second flow counter circuitry being egressed from the final arbitration stage of the switch, only the second flow counter circuitry.

11. The switch as recited in claim 1, wherein:

the first flow counter circuitry is associated with a first subswitch;

the second flow counter circuitry is associated with a second subswitch; and further comprising decrementing logic configured to:

decrement, responsive to a trigger event and dependent on a mode of the decrementing logic, the input stream counts from at least one of the first flow counter circuitry or the second flow counter circuitry; and simultaneously decrease, in response to a predetermined time period elapsing, all flow counters of the first subswitch and the second subswitch having a non-zero value.

12. A system for switch arbitration, comprising:

a first subswitch of a plurality of subswitches, the first subswitch coupled to a plurality of input ports and an output port;

an input port of the plurality of input ports coupled to an associated flow counter, the associated flow counter to increment when an input flows through the input port;

a first weighted arbiter switch coupled to the plurality of subswitches, the first weighted arbiter to receive a weight value from the first subswitch, the weight value of the first subswitch being dependent on at least one flow counter value associated with the first subswitch, the at least one flow counter value associated with the first subswitch dependent on a mode of the first subswitch, the first weighted arbiter to receive an additional weight value from an additional subswitch of the plurality of subswitches, the additional weight value of the additional subswitch being dependent on at least one flow counter value associated with the additional subswitch, the at least one flow counter value associated with the additional subswitch dependent on a mode of the additional subswitch, the first weighted arbiter switch enabling flow from the plurality of input ports to the output port based on the respective weights for the first subswitch and additional subswitch.

13. The system as recited in claim 12, further comprising a second weighted arbiter switch communicatively coupled to the first weighted arbiter switch and at least one additional weighted arbiter switch, the first weighted arbiter switch and the at least one additional arbiter switch configured to send weight information associated with input flow to the second weighted arbiter switch, the second weighted arbiter switch to enable flow to the output port based on the sent weight information.

14. The system as recited in claim 12, wherein the at least one flow counter has a same accuracy as other flow counters at a same hierarchical switch level.

15. The system as recited in claim 14, wherein the same accuracy is one of fuzzy accuracy, full flow-detection accuracy, or sufficient accuracy.

16. The system as recited in claim 14, wherein a flow counter at a first hierarchical switch level comprises an N-bit counter, where N is close to or equal to a number of possible input flows in a period.

17. The system as recited in claim 16, wherein a flow counter at a second hierarchical switch level comprises one of a 1-bit counter, a 2-bit counter, an M-bit counter, or an N-bit counter, where 1<M<N.

18. The system as recited in claim 14, wherein a flow counter at a first hierarchical switch level has a different accuracy than a flow counter at a second hierarchical switch level.

19. The system as recited in claim 12, further comprising decrementing logic to adjust the associated flow counter either responsive to a trigger event or at a pre-defined interval.

20. The system as recited in claim 12, wherein the associated flow counter comprises a set of at least one of a register and memory structure.

21. The system as recited in claim 20 wherein the set of at least one of a register and memory structure are of an adjustable depth, the depth being dependent on a desired precision for flow detection.

22. The system for switch arbitration as recited in claim 12, wherein:
- the mode of each of the first subswitch and additional subswitch comprises a fuzzy mode and a fully-accurate accounting mode;
- in the fuzzy mode, the first subswitch is configured to track flow pressure heaviness through flow counters of the first subswitch without providing a fully-accurate count of the flow counters of the first subswitch and the additional subswitch is configured to track flow pressure heaviness through flow counters of the additional subswitch without providing a fully-accurate count of the flow counters of the additional subswitch; and
- in the fully-accurate accounting mode, the first subswitch is configured to provide a value of each flow counter of the first subswitch that represents an actual flow pressure through the flow counter of the first subswitch, and the additional subswitch is configured to provide a value of each flow counter of the additional subswitch that represents an actual flow pressure through the flow counter of the additional subswitch.

23. At least one non-transitory computer readable circuitry medium having instructions encoded thereon, the instructions when executed on a machine cause the machine to:
- receive at switch circuitry a first input from a first input port, and at least a second input from one or more of a plurality of additional input ports;
- increment, dependent on a mode of the switch circuitry, flow counts associated with the first input port and increment flow counts associated with the plurality of additional input ports up to a maximum count, the mode comprising a fuzzy mode in which flow pressure heaviness is tracked without providing a fully-accurate flow count and a fully-accurate accounting mode in which a value of each flow count is provided that represents an actual flow pressure;
- sum non-zero flow counts for the input port to determine a weighted count for the input port;
- propagate the weighted count to a weighted arbiter circuitry; and
- pass input from the input ports through the weighted arbiter circuitry based on the propagated weight count.

24. The medium as recited in claim 23, wherein to sum further comprises instructions to calculate an average flow count for the input port, the sum to be calculated between one of a timing window or a packet window.

25. The medium as recited in claim 23, further comprising instructions to adjust the flow counts associated with first input port and adjust flow counts associated with the plurality of additional input ports, to adjust being either responsive to a trigger event or at a pre-defined interval.

* * * * *